Patented May 23, 1944

2,349,414

UNITED STATES PATENT OFFICE 2,349,414

PLASTIC COMPOSITION

James P. Ferrer, South Charleston, and Stuart D. Douglas, Charleston, W. Va., assignors to Carbide and Carbon Chemicals Corporation, a corporation of New York No Drawing. Application June 25, 1940, Serial No. 342,266

5 Claims. (Cl. 260—36)

This invention relates to plastic compositions comprising colloidal dispersions of certain types of vinyl resins with plasticizers. These new compositions exhibit a high degree of strength and toughness, coupled with flexibility, elasticity and resilience, and for these reasons they are eminently suited for applications where leather or its substitutes have heretofore been employed. In addition, the compositions are highly resistant to water, to oil and to most solvents and they are durable on atmospheric exposure.

The plastic compositions of this invention are derived from those types of vinyl resins which may be formed by the conjoint polymerization of vinyl halides with vinyl esters of aliphatic acids. The proportions of the respective monomers and the conditions of polymerization are such that resins having molecular weights in excess of 12,000, and preferably above 15,000, as determined by Staudinger's method, and combined vinyl halide contents from about 80% to about 95% by weight, are produced. Resins possessing these characteristics may be prepared by carrying out the polymerization at low temperatures under the influence of small amounts of a peroxide type catalyst and, if desired, in the presence of a suitable solvent as described in United States Patents Nos. 2,055,468 and 2,075,429 to Stuart D. Douglas and No. 2,064,565 to Ernest W. Reid.

To form plastic compositions from these resins having the dual qualities of strength and flexibility, it is essential that the plasticizers be incorporated within prescribed limits ranging from about 15% to about 55% by weight of the plastic composition. If a smaller amount than about 15% plasticizer be employed, the composition is seriously lacking in flexibility and, if a greater amount of plasticizer than about 55% be used, the composition is deficient in strength. The plasticizers may be incorporated with the resins by working or kneading a mixture of the two at temperatures of about 100° C. to about 150° C. on a calender or rubber mill, or in a dough-type mixing machine, until a homogeneous colloidal dispersion is obtained. If a multi-roll calender is employed in forming the sheets, it is sometimes desirable by the use of appropriate roll surfaces to impress an embossed finish on the sheet to increase its attractive appearance. On the other hand, if a two-roll differential speed rubber mill is employed, a smooth sheet may be obtained if the hot plastic composition is removed at the temperature of the rolls. If this sheet is cooled, it may again be passed through the rolls, which have been adjusted to the proper clearance, and this will impart a slight roughening to the surface. If the sheet has been appropriately colored, its general appearance resembles that of suede leather. Additional passing of the sheet roughened in this manner through the rolls of the machine will result in a sheet having a still more roughened and irregular surface.

Suitable plasticizers which may be combined with these resins to yield compositions of the type described are given in the following table, the first four listed being preferable for most purposes:

Triethyl glycol dioctoate
Triethylene glycol di(2-ethylhexoate)
Triethylene glycol di(2-ethylbutyrate)
Methoxy-ethyl acetyl ricinoleate
Dibutyl phthalate
Di(butoxyethyl) phthalate
Di(butoxyethoxyethyl) phthalate
Di(methoxyethoxyethyl) phthalate
Dioctyl maleate
Dihexyl endo-methylene tetrahydrophthalate
Dioctyl endo-methylene tetrahydrophthalate
Tricresyl phosphate
Trichlorethyl phosphate
Dibutyl sebacate To increase the resistance of the plastic composition to the deteriorating effects of light and heat, the addition of stabilizing ingredients to the plastic composition is often desirable. Examples of stabilizers which do not adversely affect the clarity of the plastic composition are organo-metallic compounds, such as dibutyl tin dilaurate, diphenyl tin oxide, dibutyl tin diacetate, triphenyl tin hydroxide, tetrapropyl lead, dipropyl diphenyl lead, triphenyl lead hydroxide, tributyl tin oleate, tributyl lead stearate, and dibutyl tin oxide. Where clarity of the plastic compositions is not important, basic stabilizers of the type represented by fatty acid soaps or salts of lead, of the alkali metals, or of the alkaline earth metals, and exemplified by lead or calcium stearates, may be used.

The compositions of the present invention provide improvements over those specifically described in United States Patent No. 1,966,856 to Frazier Groff in that they have greater strength and toughness and greater freedom from tackiness than the composition of the prior art. The present compositions have leather-like qualities, and shoes and sandals made from the new compositions in which sheets thereof are employed in the construction of the uppers, exhibit satisfactory wearing qualities.

From experiments which have been carried out, it appears that a critical change in the properties of plastic compositions derived from conjoint polymers of vinyl chloride with vinyl acetate occurs as the average molecular weight of the resin increases from about 12,000 to about 15,000. When formed from vinyl resins having molecular weights below this range, the plastic compositions have insufficient strength and toughness to serve as replacements for leather, and their excessive tackiness, especially in warm weather, is an additional disadvantage. Products formed from resins having molecular weights within the said range are usable from the standpoint of strength and tackiness, but truly preferable products for replacing leather may be obtained only if the average molecular weight of the vinyl resins from which they are derived is above 15,000.

Plastic compositions made from polyvinyl halides are also known but suffer from inadequate resistance to tearing and their inability to be fabricated in clear transparent form. As contrasted with so-called "artificial leather," the new compositions are distinguished by their strength and wearing qualities, since it is well known that the former products, which consist of a resinous coating supported on a fibrous base, are likely to disintegrate in use.

The plastic compositions of this invention, have great strength and flexibility; they may be used for all purposes where leather has heretofore been employed; and they provide certain advantages thereover. For instance, when the plastic compositions are fabricated into such articles of wearing apparel as belts, suspenders, garters, jackets and coats, their resilience and elasticity permit a "give" to the article or garment in accordance with the movements of the wearer. Likewise, the new plastic compositions may be obtained in a transparent and colorless form, in a transparent and brilliantly dyed state, or in an opaque form if pigments are included. Thus a wide variety of styles exist in which useful and attractive wearing apparel may be fashioned.

Although articles may be fabricated from the plastic compositions by means of the methods customarily employed in making leather goods, such as by sewing, plaiting, or by joining various pieces through grommets, snaps, or buttons, the thermoplastic nature of the new products permits their fabrication into articles by less costly methods. For instance, the plastic compositions may be fashioned into various articles by extrusion and by injection or compression molding. Also, separate pieces may be joined by the application of heat and pressure or by softening their surfaces with a solvent and then applying heat and pressure to them.

In addition, the new plastic compositions possess good resistance to corrosive chemicals, which suggests their use as a lining for tanks, pipes and tank cars, as gaskets, and as protective coverings in general.

Types of articles, other than wearing apparel, which may be formed from the new compositions are brief cases, traveling cases, handbags, bill folds, key cases, tobacco pouches, watch straps and chains, seat covers, book bindings, animal harnesses, cords and thongs, panels and the like. Illustrations of plastic compositions which are useful for forming the types of articles enumerated, as well as for fashioning into wearing apparel, will be given in the following examples.

*Example 1*

The following composition was prepared and formed into a homogeneous sheet by working it on a rubber mill at a temperature of about 110° C.:

Parts by weight
Conjoint polymer of vinyl chloride with vinyl acetate, average molecular weight about 18,000, combined vinyl chloride about 90% by weight_____ 350
Triethylene glycol dioctoate_____ 150
Dibutyl tin dilaurate_____ 5

A thin strip was cut from the clear and transparent sheet thus obtained. It was fashioned into a belt by looping the end of the strip through the slot in the buckle and joining the end to the opposite side of the strip by first softening the material with dioxane and then applying heat and pressure.

A variety of articles, of the type previously enumerated, were also fabricated in dyed, in pigmented, and in clear transparent forms, using a stabilized vinyl resin of the type identified above and amounts of triethylene glycol di-2-ethyl butyrate as a plasticizer ranging from 22% to 28% by weight of the plastic composition.

*Example 2*

The following plastic composition was prepared:

Parts by weight
Conjoint polymer of vinyl chloride with vinyl acetate, average molecular weight about 25,100, combined vinyl chloride about 93.2% by weight_____ 68
Triethylene glycol dihexoate_____ 32
Dibutyl tin dilaurate_____ .1

This composition was fabricated into a homogeneous sheet by working it on a rubber mill at a temperature of about 135° C., a slightly higher temperature being necessitated for complete dispersion of this more highly polymerized resin than is required for the one shown in the preceding example. The resin employed in making this dispersion was near the maximum vinyl chloride content permissible and the plastic composition was not quite as strong nor as transparent as that described in the previous example. However, it still possessed desirable properties for use in making the type of articles previously described. Moreover, in certain respects, namely, in the improved feel and texture of the sheet and its complete freedom from tackiness, the plastic compositions derived from the conjoint polymer resins having vinyl chloride contents within the upper range of the permissible limit are superior to the dispersions prepared from the resins of lower vinyl chloride content.

*Example 3*

The following plastic composition was prepared:

Parts by weight
Conjoint polymer of vinyl chloride with vinyl acetate, average molecular weight about 30,100, combined vinyl chloride about 91.7% by weight_____ 70
Triethylene glycol dihexoate_____ 30
Dibutyl tin dilaurate_____ 1

A dispersion of the resin and plasticizer was compounded by mixing the ingredients on a rubber mill heated to a temperature of about 135° C. A sheet having properties similar to that described in Example 2 was formed, although the sheet was a little less elastic.

*Example 4*

The following plastic composition was prepared:

| | Parts by weight |
|---|---|
| Conjoint polymer of vinyl chloride with vinyl acetate, average molecular weight about 30,100, combined vinyl chloride about 91.7% by weight | 67 |
| Di(ethoxyetheneoxyethyl) phthalate | 33 |
| Dibutyl tin dilaurate | 1 |

The resin and the plasticizer were dispersed in the usual manner on a heated rubber mill. The resultant sheet was practically homogeneous and contained but a very slight haze. The composition was of high strength and this indicates the desirability of using resins of very high molecular weight, where an extremely strong and tough composition is desired.

Wearing apparel, notably belts, garters and watch straps and suspenders, made from plasticized vinyl resin compositions of the type described, have been extensively tested in service. They have proved remarkably resistant to moisture, particularly perspiration, whereas leather shows a tendency to mildew or to rot under such conditions. Dirt, oil and grease, which may have come in contact with the article, were easily removed by washing. Since the surface of the article is impervious to moisture, the wearing apparel can be readily wiped dry. Over the period the tests have been in progress, the wearing apparel have retained their elasticity and strength, they have not become discolored or soiled and they have kept their original shape and appearance.

Certain of the articles disclosed in this application are specifically claimed in divisional applications Serial Nos. 473,856, 473,857 and 473,858, filed January 28, 1943.

Modifications of the invention other than as described will doubtless occur to those skilled in the art and such modifications are included within the scope of the invention as defined by the appended claims.

We claim:

1. A shaped article having its form defined by thin sheet material, said sheet material being characterized by high tensile strength and freedom from tackiness, together with flexibility, resiliency, elasticity and resistance to oil, moisture and perspiration, and being composed of a homogeneous dispersion of a vinyl resin, plasticizer and a small amount of a stabilizer, said vinyl resin being a conjoint polymer of vinyl chloride with vinyl acetate containing from about 80 to 95% of copolymerized vinyl chloride and having an average molecular weight greater than 15,000, and said plasticizer being present in an amount between about 22% and about 55% by weight of the sheet material.

2. A shaped article having its form defined by clear and transparent sheet material, said sheet material being characterized by high tensile strength and freedom from tackiness, together with flexibility, resiliency, elasticity and resistance to oil, moisture and perspiration, and being composed of a homogeneous dispersion of a vinyl resin, plasticizer and a small amount of a stabilizer, said vinyl resin being a conjoint polymer of vinyl chloride with vinyl acetate containing from about 80 to 95% of copolymerized vinyl chloride and having an average molecular weight between 15,000 and 30,100, and said plasticizer being present in an amount between about 22% and about 55% by weight of the sheet material.

3. A shaped article having its form defined by clear and transparent thin sheet material, said sheet material being characterized by high tensile strength and freedom from tackiness, together with flexibility, resiliency, elasticity and resistance to oil, moisture and perspiration, and being composed of a homogeneous dispersion of a vinyl resin, an ester plasticizer having from two to three ester groups and a small amount of a stabilizer, said vinyl resin being a conjoint polymer of vinyl chloride with vinyl acetate containing about 90% of copolymerized vinyl chloride and having an average molecular weight of about 18,000, and said plasticizer being present in an amount between about 22% and about 55% by weight of the sheet material.

4. A shaped article having its form defined by clear and transparent sheet material, said sheet material being characterized by high tensile strength and freedom from tackiness, together with flexibility, resiliency, elasticity and resistance to oil, moisture and perspiration, and being composed of a homogeneous dispersion of a vinyl resin, plasticizer comprising triethylene glycol di(2-ethylhexoate) and a small amount of a stabilizer, said vinyl resin being a conjoint polymer of vinyl chloride with vinyl acetate containing from about 80 to 95% of copolymerized vinyl chloride and having an average molecular weight greater than 15,000, and said plasticizer being present in an amount between about 22% and about 55% by weight of the sheet material.

5. A shaped article having its form defined by thin sheet material, said sheet material being characterized by high tensile strength and complete freedom from tackiness, together with improved feel and texture, flexibility, resiliency, elasticity and resistance to oil, moisture and perspiration, and being composed of a homogeneous dispersion of a vinyl resin, an ester plasticizer having from two to three ester groups and a small amount of a stabilizer, said vinyl resin being a conjoint polymer of vinyl chloride with vinyl acetate containing from about 93 to 95% of copolymerized vinyl chloride and having an average molecular weight of about 25,000 and said plasticizer being present in an amount between about 22% and about 55% by weight of the sheet material.

J. P. FERRER.
STUART D. DOUGLAS.

CERTIFICATE OF CORRECTION.

Patent No. 2,349,414.  May 23, 1944.

JAMES P. FERRER, ET AL.

It is hereby certified that error appears in the printed specification of the above numbered patent requiring correction as follows: Page 1, second column, line 15, for "Triethyl" read --Triethylene--; and that the said Letters Patent should be read with this correction therein that the same may conform to the record of the case in the Patent Office.

Signed and sealed this 25th day of July, A. D. 1944.

Leslie Frazer

(Seal)  Acting Commissioner of Patents.